United States Patent
Osgood et al.

(10) Patent No.: US 11,519,277 B2
(45) Date of Patent: Dec. 6, 2022

(54) COMPONENT WITH COOLING PASSAGE FOR A TURBINE ENGINE

(71) Applicant: General Electric Company, Schenectady, NY (US)

(72) Inventors: Daniel Endecott Osgood, Cincinatti, OH (US); Kirk Douglas Gallier, Cincinatti, OH (US); Gregory Terrence Garay, West Chester, OH (US); Zachary Daniel Webster, Mason, OH (US); Daniel Lee Durstock, Fort Wayne, KY (US); Ricardo Caraballo, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/231,263

(22) Filed: Apr. 15, 2021

(65) Prior Publication Data

US 2022/0333490 A1  Oct. 20, 2022

(51) Int. Cl.
*F01D 5/18*  (2006.01)

(52) U.S. Cl.
CPC ........ *F01D 5/187* (2013.01); *F05D 2240/304* (2013.01); *F05D 2260/201* (2013.01); *F05D 2260/202* (2013.01); *F05D 2260/232* (2013.01)

(58) Field of Classification Search
CPC ............... F01D 5/187; F05D 2240/304; F05D 2260/201; F05D 2260/204
See application file for complete search history.

(56) References Cited

U.S. PATENT DOCUMENTS

| 5,378,108 | A  | * | 1/1995  | Zelesky ................. | F01D 5/187  |
|           |    |   |         |                          | 415/115     |
| 5,498,133 | A  | * | 3/1996  | Lee ....................... | F01D 5/186  |
|           |    |   |         |                          | 416/97 R    |
| 6,126,397 | A  | * | 10/2000 | Kvasnak ................ | F01D 5/186  |
|           |    |   |         |                          | 415/115     |
| 6,241,466 | B1 |   | 6/2001  | Tung et al.              |             |
| 6,422,819 | B1 |   | 7/2002  | Tsai et al.              |             |
| 6,616,406 | B2 | * | 9/2003  | Liang ..................... | F01D 5/187  |
|           |    |   |         |                          | 416/97 R    |
| 7,766,615 | B2 |   | 8/2010  | Spangler et al.          |             |
| 9,422,816 | B2 | * | 8/2016  | Spangler ................ | F01D 5/186  |
| 9,447,692 | B1 |   | 9/2016  | Liang                    |             |
| 9,874,110 | B2 |   | 1/2018  | Vandervaart et al.       |             |

(Continued)

*Primary Examiner* — Eldon T Brockman
(74) *Attorney, Agent, or Firm* — McGarry Bair PC

(57) ABSTRACT

An airfoil for a turbine engine having a working airflow separated into a cooling airflow and a combustion airflow, the airfoil comprising a wall defining an interior and having an outer surface over which flows the combustion airflow, the outer surface defining a first side and a second side extending between a leading edge and a trailing edge to define a chord-wise direction; at least one cooling conduit located within the interior and fluidly coupled to the cooling airflow. A primary cooling passage having at least one inlet fluidly coupled to the at least one cooling conduit, a primary outlet on the outer surface. A passage connecting the at least one inlet to the primary outlet, the passage separated into a first portion and a second portion. The primary outlet spaced from the trailing edge a predetermined distance.

27 Claims, 11 Drawing Sheets

(56) References Cited

U.S. PATENT DOCUMENTS

| | | |
|---|---|---|
| 9,890,646 B2 | 2/2018 | Krueckels et al. |
| 10,060,267 B2 | 8/2018 | Lutjen |
| 2002/0187043 A1* | 12/2002 | Liang .................. F01D 5/187 |
| | | 416/97 R |
| 2014/0205454 A1 | 7/2014 | Giovannetti et al. |

* cited by examiner

COMPONENT WITH COOLING PASSAGE FOR A TURBINE ENGINE

TECHNICAL FIELD

The disclosure generally relates to a cooling passage for an engine, and more specifically to a set of cooling passages for cooling a trailing edge of an airfoil.

BACKGROUND

Turbine engines, and particularly gas or combustion turbine engines, are rotary engines that extract energy from a flow of combusted gases passing through the engine and flowing over a multitude of airfoils, including stationary vanes and rotating turbine blades.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades generally include one or more interior cooling circuits for routing the cooling air through the airfoil to cool different portions of the airfoil, and can include dedicated cooling circuits for cooling different portions of the airfoil, such as the leading edge, trailing edge and tip of the airfoil.

BRIEF DESCRIPTION

Aspects and advantages of the disclosure will be set forth in part in the following description, or may be obvious from the description, or may be learned through practice of the disclosure herein.

In one aspect, the disclosure relates to an engine component for a turbine engine having a working airflow separated into a cooling airflow and a combustion airflow, the engine component comprising a wall defining an interior and having an outer surface over which flows the combustion airflow, the outer surface defining a first side and a second side extending between a leading edge and a trailing edge to define a chord-wise direction with the wall having a thickness "T" proximate the trailing edge; at least one cooling conduit located within the interior and fluidly coupled to the cooling airflow; a primary cooling passage having at least one inlet fluidly coupled to the cooling conduit, a primary outlet on the outer surface, and a passage connecting the inlet to the outlet, with the primary outlet having a downstream point spaced a first distance D1 from the trailing edge, and an upstream point spaced a second distance D2 from the trailing edge, wherein the thickness T is greater than or equal to a difference between the first distance D1 and second distance D2 (T≥(D2−D1)).

In another aspect, the disclosure relates to an airfoil for a turbine engine having a working airflow separated into a cooling airflow and a combustion airflow, the airfoil comprising a wall defining an interior and having an outer surface over which flows the combustion airflow, the outer surface defining a first side and a second side extending between a leading edge and a trailing edge to define a chord-wise direction with the wall having a thickness "T" proximate the trailing edge; at least one cooling conduit located within the interior and fluidly coupled to the cooling airflow; a primary cooling passage having at least one inlet fluidly coupled to the cooling conduit, a primary outlet on the outer surface, a passage connecting the at least one inlet to the primary outlet, an impingement zone located within the passage between the at least one inlet and the primary outlet, with the impingement zone separating the passage into a first portion, having a curvilinear centerline, extending between the at least one inlet and the impingement zone, and a second portion, having a diffusion section, extending between the impingement zone and the primary outlet.

These and other features, aspects and advantages of the disclosure will become better understood with reference to the following description and appended claims. The accompanying drawings, which are incorporated in and constitute a part of this specification, illustrate the disclosure and, together with the description, serve to explain the principles of the disclosure herein.

BRIEF DESCRIPTION OF THE DRAWINGS

A full and enabling disclosure, including the best mode thereof, directed to one of ordinary skill in the art, is set forth in the specification, which makes reference to the appended figures in which.

DETAILED DESCRIPTION

Figure 1:
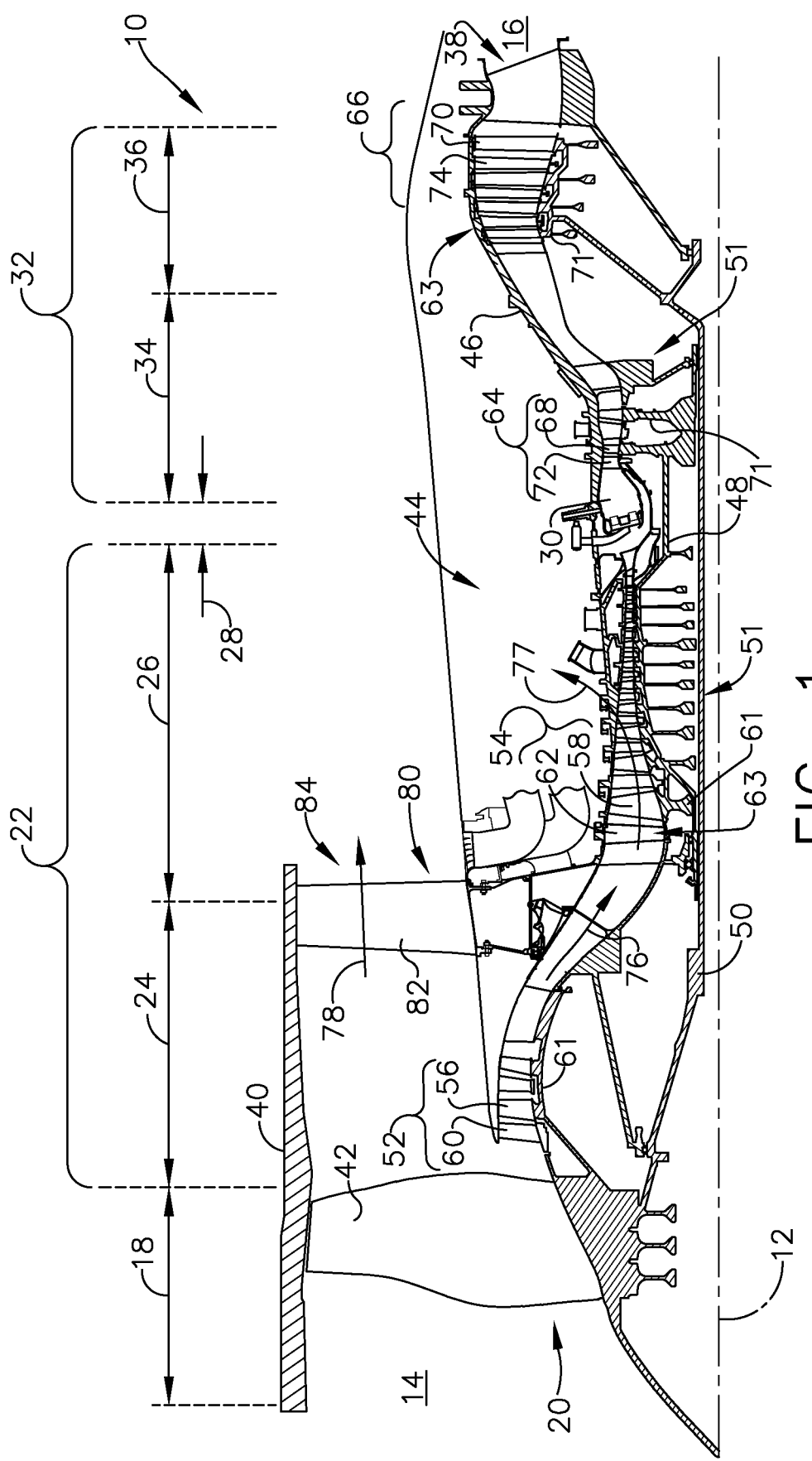
FIG. 1 is a schematic, cross-sectional diagram of a gas turbine engine for an aircraft.

Aspects of the disclosure described herein are directed to a cooling hole provided in an engine component. More specifically, the disclosure is directed toward one or more cooling holes provided in an airfoil proximate a trailing edge of the airfoil. For purposes of illustration, the present disclosure will be described with respect to the turbine blade for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased above the bleed air temperature. The bleed air 77 may be used to reduce the temperature of the core components downstream of the combustor.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
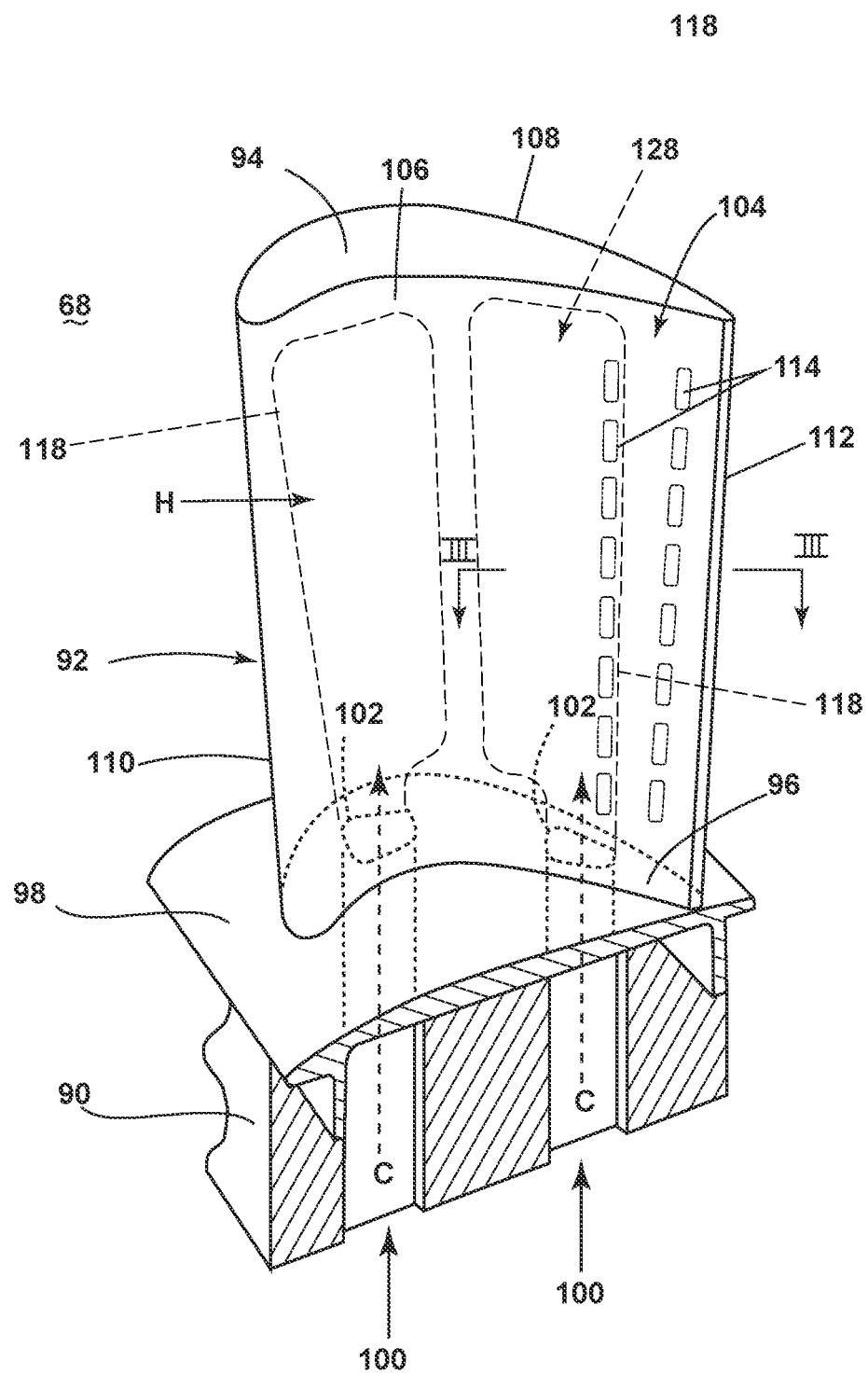
FIG. 2 is a perspective view of an airfoil of the engine of FIG. 1 in the form of a blade including a set of cooling passages.

Referring now to FIG. 2, an engine component in the form of one of the turbine blades 68 of the engine 10 from FIG. 1 is shown. Alternatively, the engine component can be a vane, a strut, a service tube, a shroud, or a combustion liner in non-limiting examples, or any other engine component that can require or utilize cooling passages. The turbine blade 68 includes a dovetail 90 and an airfoil 92. The dovetail 90 further includes at least one inlet passage 100, shown as a two exemplary inlet passages 100, each extending through the dovetail 90 to provide internal fluid communication with the airfoil 92 at a passage outlet 102. It should be appreciated that the dovetail 90 is shown in cross-section, such that the inlet passages 100 are housed within the body of the dovetail 90. The dovetail 90 can be configured to mount to a turbine rotor disk 71 on the engine 10 of FIG. 1, for example.

The airfoil 92 extends radially between a tip 94 and a root 96 defining a span-wise direction therebetween. The airfoil 92 mounts to the dovetail 90 at a platform 98 at the root 96. The platform 98 helps to radially contain the turbine engine mainstream airflow. Additionally, the airfoil 92 includes an outer wall 104 including a first side 106 and a second side 108, and extending between a leading edge 110 and a trailing edge 112 to define a chord-wise direction therebetween. The first side 106 can be a pressure side and the second side 108 can be a suction side of a turning vane as illustrated. It is also further contemplated that the airfoil 92 can be a non-turning vane, by way of non-limiting example a frame fairing. It is also further contemplated that neither the first or second sides 106, 108 are curved to form a pressure side and/or suction side. The outer wall 104 can partially define and surround at least one cooling conduit 118, shown as two exemplary cooling conduits 118 forming a cooling circuit 128.

A set of cooling passages 114 exhaust on the first side 106 adjacent the trailing edge 112 and are arranged in a span-wise row. Optionally, another set of cooling passage can be provided on the second side 108, but is obscured by the perspective of FIG. 2. Furthermore, it is contemplated that the cooling passages 114 can have an outlet on the trailing edge 112.

In operation, a hot gas flow (H), such as a combustor flow, can pass along the exterior of the outer wall 104 of the airfoil 92. A cooling fluid flow (C) can be provided to the inlet passages 100 and into the airfoil 92 at the passage outlets 102, passing into the cooling conduits 118. The cooling fluid flow (C) can be provided throughout the airfoil 92 and exhausted from the cooling passages 114 as a cooling film.

Figure 3:
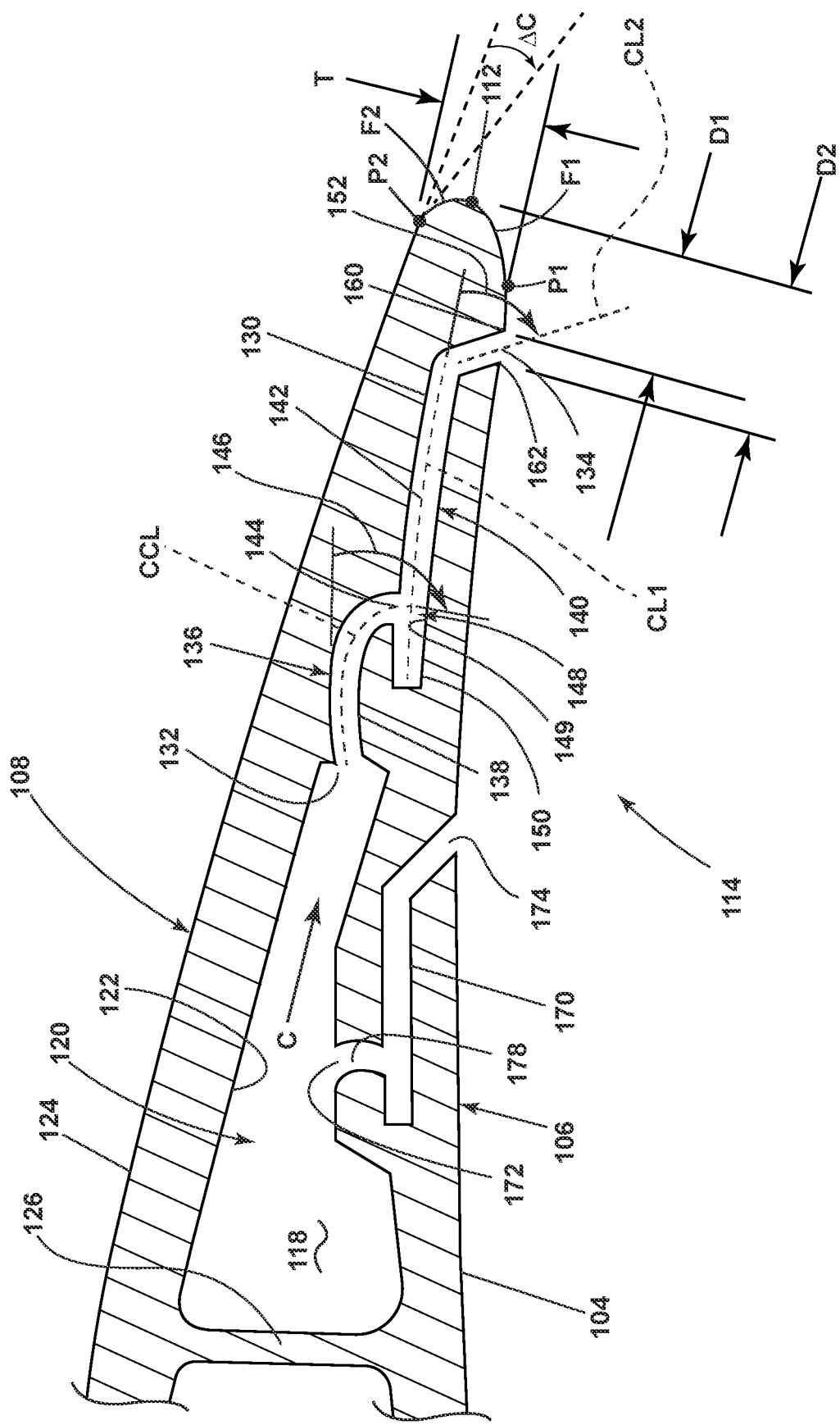
FIG. 3 is a cross-sectional view of the set of cooling passages taken along line III-III of FIG. 2.

Referring now to FIG. 3, showing section of FIG. 2, the airfoil 92 includes an interior 120 defined by the outer wall 104. The outer wall 104 can further include an inner surface 122 and an outer surface 124, with the inner surface 122 defining the interior 120. A rib 126 can extend from the first side 106 of the outer wall 104 to the second side 108 of the outer wall 104, effectively separating the interior 120 into the separate cooling conduits 118 (FIG. 2) including an aft-most cooling conduit 118 as illustrated. The cooling conduits 118 can form at least a portion of the cooling circuit 128 within the interior 120 of the airfoil 92. It should be appreciated that the rib 126, the cooling conduits 118, and the cooling circuit 128 as shown are exemplary, and a myriad of different cooling circuits 128 can be formed within the airfoil 92, including, but not limited to one or more of a cooling conduit, channels, passages, ducts, cooling inlets, full-length ribs or partial-length ribs in either the span-wise or chord-wise planes, near wall cooling passages, turbulators, pins, fins, or any other structure forming the airfoil 92.

The set of cooling passages 114 fluidly couple the interior 120 to the exterior of the airfoil 92 at the outer surface 124, and provide for exhausting a cooling fluid near the trailing edge 112 along the outer surface 124. The set of cooling passages 114 can include a primary cooling passage 130 provided adjacent the trailing edge 112 and exhausting from the aft-most cooling conduit 118 located substantially toward the trailing edge 112. The outer wall 104 can have a thickness (T) proximate the trailing edge 112. It can more clearly be seen that the trailing edge 112 is an aft most point of the airfoil 92 in the chord. The thickness (T) can be defined as a dimension of the outer wall 104 between the first and second sides 106, 108 upstream of the trailing edge 112 at a significant curvature change along the outer wall 104 from each of the first and second sides 106, 108 to the trailing edge 112. The significant curvature change can be defined as a first tangent point (P1) where the first side 106 meets a first trailing edge fillet (F1) and a second tangent point (P2) where the second side 108 meets a second trailing edge fillet (F2). Alternatively, the first and second tangent points (P1, P2) can be defined as at least a 5% change (ΔC) between either of the first or second sides 106, 108 and the corresponding fillet (F1, F2). In other words, the thickness (T) is a straight-line distance between points (P1) and (P2).

The primary cooling passage 130 can include at least one inlet 132 at the cooling conduit 118 and a primary outlet 134, referred to herein as the outlet 134, at the outer surface 124. The primary cooling passage 130 can be two-part having a first portion 136 including a supply passage 138 and a second portion 140 including an outlet passage 142. An intermediate opening 144 can fluidly connect the supply passage 138 to the outlet passage 142.

The supply passage 138 extends between and fluidly couples the cooling conduit 118 to the outlet passage 142. The supply passage 138 can be curved or arcuate, curving in any direction, such as the radial direction, the axial direction, the span-wise direction, or the chord-wise direction in non-limiting examples. Curved, as used herein, can mean that the centerline is non-linear. Alternatively, curved can mean that at least a portion of the supply passage 138 is arcuate or includes an arcuate outer wall defining the curvature. The supply passage 138 can define a curvilinear centerline (CCL) extending between the at least one inlet 132 and the intermediate opening 144. The curvilinear centerline (CCL) can define a first turn 146, by way of non-limiting example towards the first side 106. The first turn 146 can define an angle that is greater than 90 degrees.

Alternatively, it is contemplated that the supply passage 138 is linear. Furthermore, it is contemplated that one or both of the supply passage 138 and the outlet passage 142 are curved.

The second portion 140 can further include an impingement zone 148. The impingement zone 148 can include the first turn 146, the intermediate opening 144 and an impingement surface 149 defined by a portion of the outlet passage 142 opposite the intermediate opening 144 where a cooling fluid flow (C) from the supply passage 138 impinges, or hits. As illustrated, the first turn 146 can be toward the first side 106 so that impingement occurs at the outer wall 104 along the first side 106 resulting in cooling of the first side 106.

The second portion 140 can further include a pocket 150. The pocket 150 can be defined by an end of the outlet passage 142 opposite the outlet 134. The pocket 150 can be located proximate the impingement zone 148. The pocket 150 can capture particles to clean the cooling fluid (C) prior to flowing through the remaining portion of the outlet passage 142. While illustrated as having a pocket 150, the set of cooling passages 114 need not include the pocket 150.

The outlet passage 142 can define at least one centerline, illustrated as multiple centerlines. A first centerline (CL1) can extend in a first direction from the pocket 150 towards the trailing edge 112. The first centerline (CL1) can be generally parallel to the first side 106. While illustrated as generally parallel, the first centerline (CL1) can be parallel with either the first side 106, the second side 108 or extend in any direction toward the trailing edge 112. A second centerline (CL2) can extend along a second direction, different than the first direction, from the outlet 134 toward the second side 108. A second turn 152 can be defined by the intersection of the first centerline (CL1) and the second centerline (CL2). The second turn 152 can define an angle that is less than 90 degrees. While the outlet passage 142 is illustrated as generally linear, it is contemplated that the outlet passage 142 can be curved or arcuate, in any direction, similar to that described for the supply passage 138.

The primary cooling passage need not exhaust precisely at the trailing edge 112. The outlet 134 of the outlet passage 142 can be arranged on the outer surface 124 downstream of the aft-most cooling conduit 118, but upstream of the trailing edge 112. The outlet 134 of the outlet passage 142 can be located within a predetermined distance of the trailing edge 112. The outlet 134 can define an opening along the outer surface 124 extending between a downstream edge 160 and an upstream edge 162. A first dimension measured from a point at the downstream edge 160 to the trailing edge 112 defines a first distance (D1). A second dimension measured from a point at the upstream edge 162 to the trailing edge 112 defines a second distance (D2). The first and second distances (D1), (D2) are each defined as a straight-line distance from the trailing edge to each of the respective upstream edge 160 and downstream edge 162. As illustrated, the measuring lines extending from each of the trailing edge 112 and the respective upstream edge 160 and downstream edge 162 should be parallel to each other.

In a first example, see equation 1 below, the thickness (T) is greater than or equal to a difference between the first distance (D1) and the second distance (D2).

$$(T \geq (D2-D1)) \qquad \text{Equation 1:}$$

In a second example, see equation 2 below, the first dimension (D1) is greater than or equal to half the thickness.

$$(D1 \geq (T/2)) \qquad \text{Equation 2:}$$

In a third example, see equation 3 below, the second distance (D2) is greater than or equal to the thickness (T). Further, the second distance (D2) is less than or equal to five times the thickness.

$$(T \leq D2 \leq 5*T) \qquad \text{Equation 3:}$$

A secondary cooling passage 170 similar in geometry to the primary cooling passage 130 can be located upstream of the primary cooling passage 130. The secondary cooling passage 170 can extend between a second inlet 172 and a second outlet 174 located along the first side 106 upstream of the outlet 134.

While the set of cooling passages 114 illustrated include a primary cooling passage 130 and a secondary cooling passage 170, any number of cooling passages is contemplated, being one or more. Additionally, the set of cooling passages 114 can be arranged in the span-wise direction. Moreover, each cooling passage as shown can be part of a set of cooling passages 114 in span-wise arrangement. Further yet, it should be appreciated that the supply passage 138 of the primary cooling passage 130 is longer than a supply passage 178 of the secondary cooling passage, permitting partial overlap among the cooling passages 114 defined along a chord of the airfoil 92. Such an overlap can be used to tailor local cooling from the cooling passages 114 to portions of the airfoil 92 in most need of local cooling; the portions of which can be identified with solid state analysis, for example.

Figure 3A:
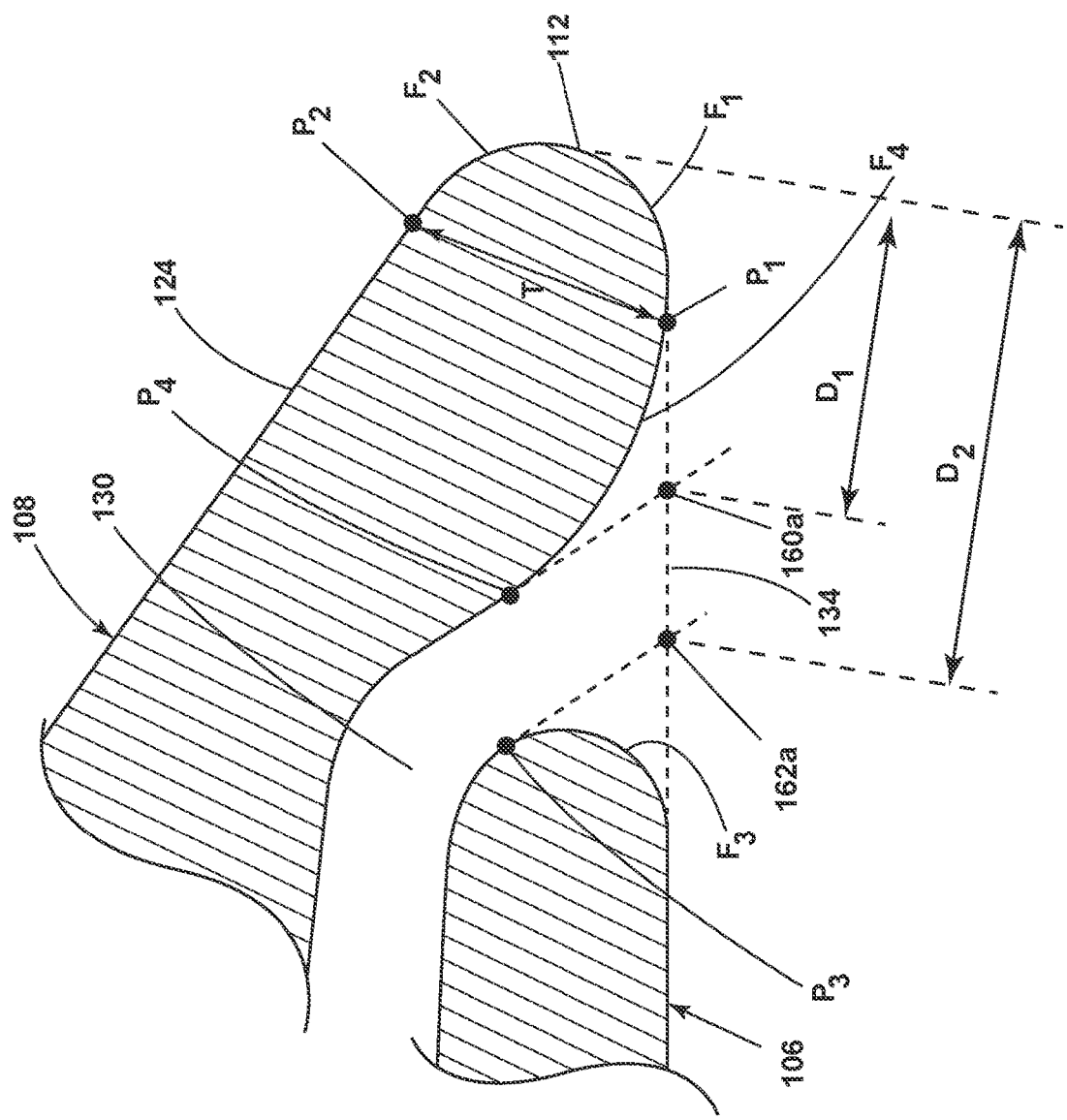
FIG. 3A is an enlarged view of a variation of an outlet portion of the set of cooling passages according to an aspect of the disclosure herein.

FIG. 3A is an enlarged view of a variation of the set of cooling passages 114 at the outlet 134. It is contemplated that during production the outlet 134 can terminate in at least one fillet, illustrated herein as third and fourth fillets (F3, F4). In the event a fillet is formed at the outlet 134, the difference between the second distance (D2) and the first distance (D1) is the smallest dimension of the outlet 134 measured along the outer surface 124. In other words, the points at the downstream edge 160 and the upstream edge 162 are now points 160a, 162a in this variation spaced from the third and fourth fillets (F3, F4). Each point 160a, 162a is located at an intersection of the outer surface 124, extended across the outlet 134 in dashed line, and tangent lines illustrated in dashed line extending from points (P3, P4) in the primary cooling passage 130 where the third and/or fourth fillet (F3, F4) begin respectively. It should be understood that the dimension (D2−D1) is the smallest dimension of the outlet 134 at the outer surface 124 in all aspects described herein.

Figure 4:
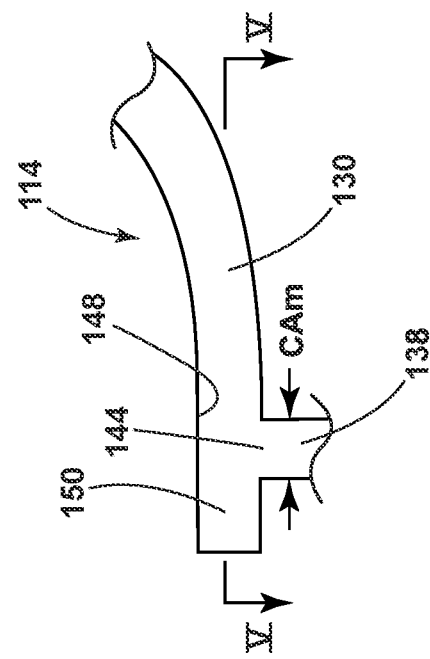
FIG. 4 is a schematic of a cooling passage of the set of cooling passages from FIG. 3 with an intermediate opening.

FIG. 4 is a schematic of a portion of one of the set of cooling passages 114, by way of non-limiting example the primary cooling passage 130. The schematic includes the intermediate opening, the impingement zone 148 and the pocket 150. The supply passage 138 can be a metering section defining the smallest cross-sectional area ($CA_m$) of the primary cooling passage 130. It should be appreciated that more than one metering section can be formed in the set of cooling passages 114. The metering section can extend from the inlet 132 (FIG. 3) to the intermediate opening 144. It is further contemplated that the metering section has no length and can define the intermediate opening 144 or the inlet 132. The cross-sectional area ($CA_m$) can be a circular shape, though any cross-sectional shape is contemplated.

Figure 5:
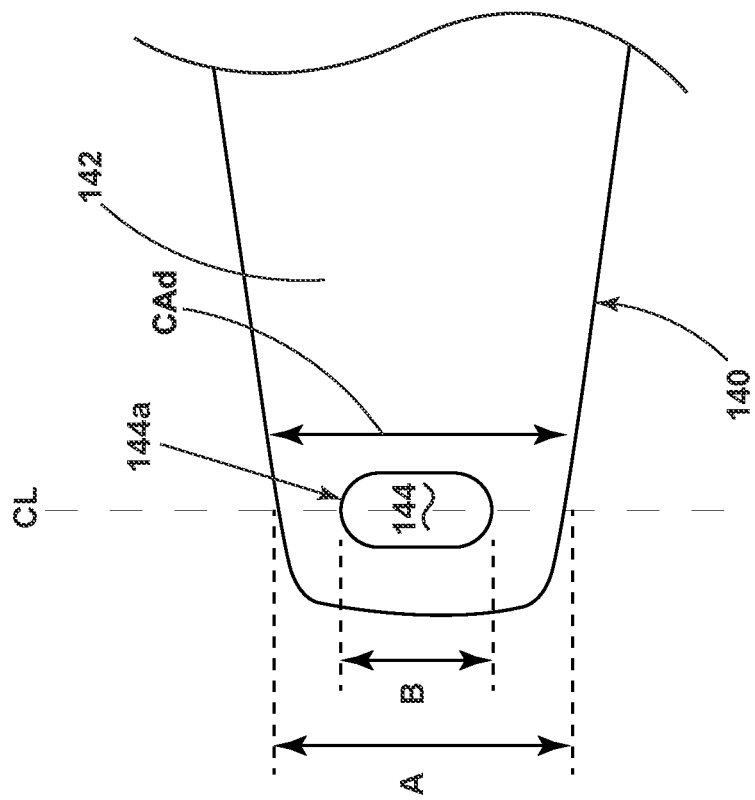
FIG. 5 is a cross-sectional view of the cooling passage taken along line V-V of FIG. 4 illustrating one exemplary shape of the intermediate opening.

Turning to FIG. 5, a top down view of FIG. 4 along line V-V is illustrated. In one example the intermediate opening 144 can have a racetrack shape 144a extending in the span-wise direction. The outlet passage 142 can be a diffusing section such that a cross-sectional area (CAd) of the outlet passage 142 can increase extending downstream from the intermediate opening 144. In one example, the cross-sectional area (CAd) is continuously increasing. In one alternative, non-limiting implementation, the increasing cross-sectional area (CAd) can be a discontinuous or stepwise increasing cross-sectional area.

A distance (A) measured along a centerline (CL) of the intermediate opening 144 defines a width of the outlet passage 142. A distance (B) measured along the centerline of the intermediate opening defines a width of the intermediate opening 144. A ratio of A:B can be less than 3 (A/B<3). It is further contemplated that a ratio of A:B can be less than 2 (A/B<2).

Figure 6:
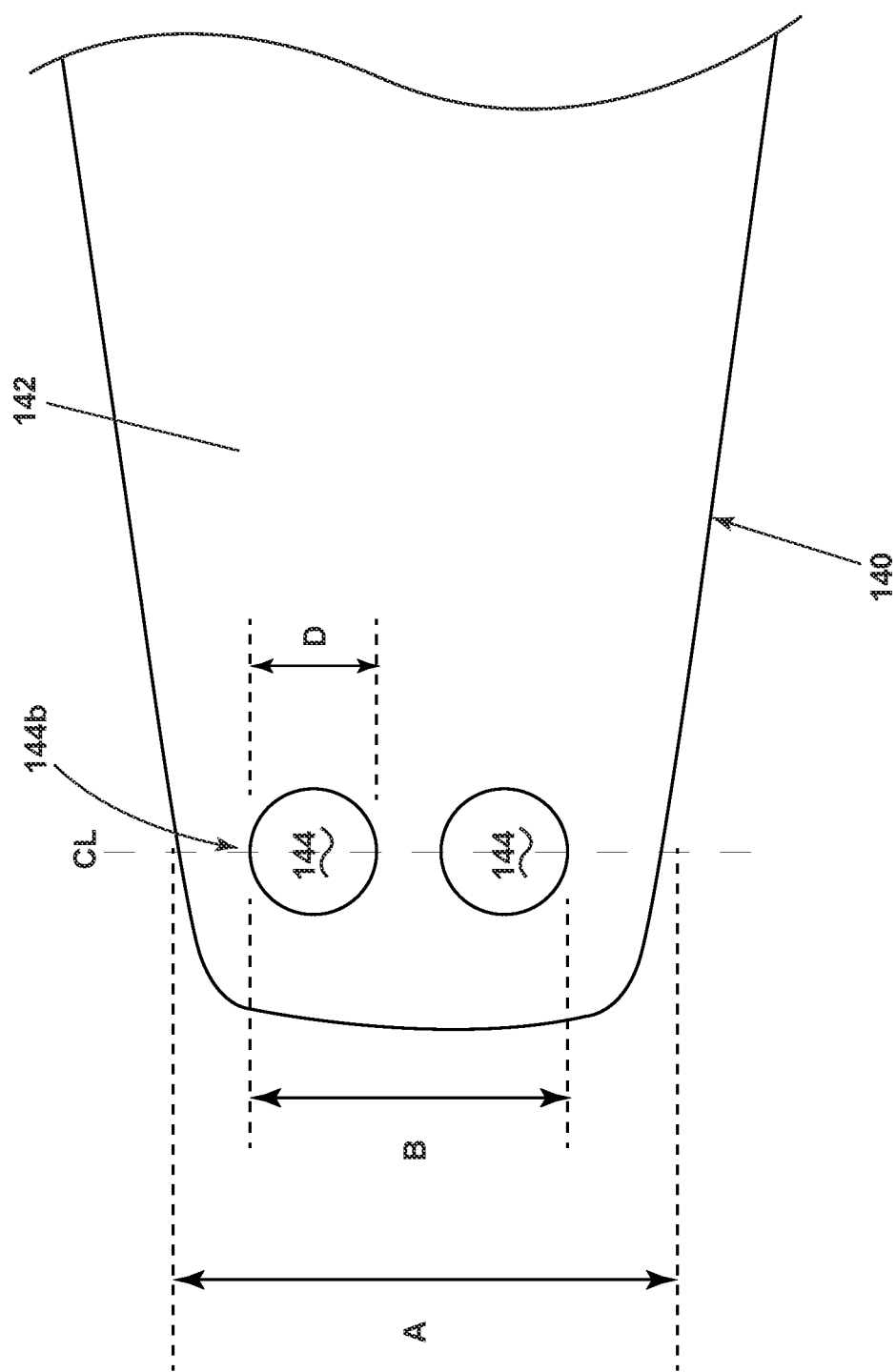
FIG. 6 is an alternative cross-sectional view of the cooling passage taken along line V-V of FIG. 4 illustrating another exemplary shape of the intermediate opening.

Turning to FIG. 6, another exemplary top down view of FIG. 4 along line V-V is illustrated. In another example the intermediate opening 144 can be a multiple openings, illustrated as a pair of openings (N=2) each with a substantially circular shape 144b having a diameter (D). It should be understood that the diameter (D) as described herein can be a hydraulic diameter (DH) when the intermediate opening 144 is not circular. A number of openings can be represented by the letter "N". A distance (A) measured along the centerlines (CL) of the intermediate openings 144 defines a width of the outlet passage 142. A ratio of A:(D*N) can be less than 4 ((A/(D*N)<4). A distance (B) measured along the centerline of the intermediate opening defines a width of the intermediate opening 144. A ratio of A:B can be less than 3 (A/B<3). It is further contemplated that a ratio of A:B can be less than 2 (A/B<2).

Figure 7:
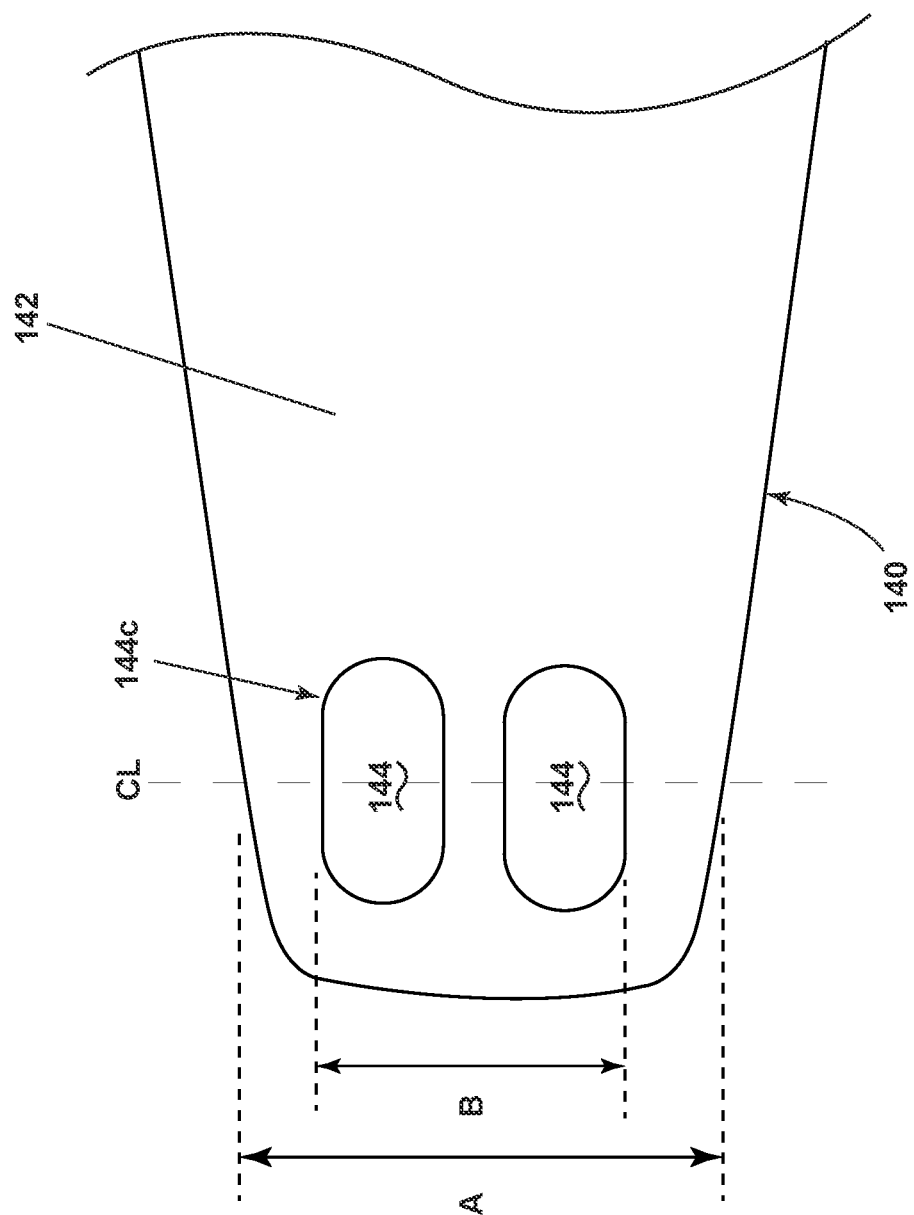
FIG. 7 is yet another alternative cross-sectional view of the cooling passage taken along line V-V of FIG. 4 illustrating yet another exemplary shape of the intermediate opening.

Turning to FIG. 7, yet another exemplary top down view of FIG. 4 along line V-V is illustrated. In yet another example the intermediate opening 144 can be a multiple openings, illustrated as a pair of openings (N=2) each with a substantially racetrack shape 144c extending in the chord-wise direction and defining a hydraulic diameter (DH). The number of openings can be represented by the letter "N". A racetrack shape, also known as a stadium shape, is a two-dimensional geometric shape constructed from a rectangle with semicircles at a pair of opposite sides. A distance (A) measured along the centerlines (CL) of the intermediate openings 144 defines a width of the outlet passage 142. A ratio of A:(DH*N) can be less than 4 ((A/(DH*N)<4). A and B are distances measured as previously described herein. A ratio of A:B can be less than 3 (A/B<3). It is further contemplated that a ratio of A:B can be less than 2 (A/B<2).

Figure 8:
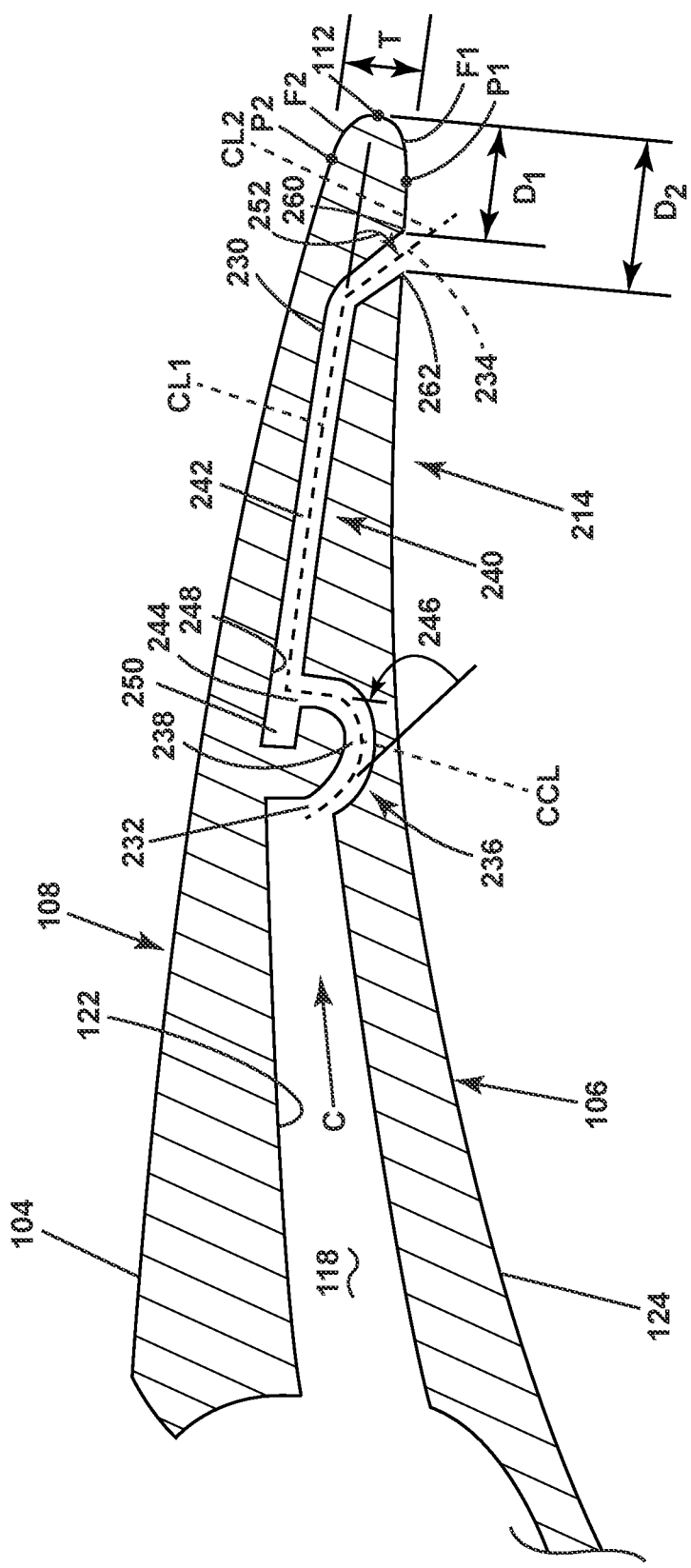
FIG. 8 is an alternative cross-sectional view of the set of cooling passages taken along line of FIG. 2 according to another aspect of the disclosure herein.

FIG. 8 illustrates a set of cooling passages 214 according to another aspect of the disclosure discussed herein. The set of cooling passages 214 are substantially similar to the set of cooling passages 114, therefore, like parts will be identified with like numerals increased by 100. It should be understood that the description of the like parts of the set of cooling passages 114 applies to the set of cooling passages 214 unless otherwise noted.

The set of cooling passages 214 includes a primary cooling passage 230 extending between at least one inlet 232 at the cooling conduit 118 and an outlet 234 at the outer surface 124. The primary cooling passage 230 can be two-part having a first portion 236 including a supply passage 238 and a second portion 240 including an outlet passage 242. An intermediate opening 244 can fluidly connect the supply passage 238 to the outlet passage 242.

The supply passage 238 can define a curvilinear centerline (CCL) extending between the at least one inlet 232 and the intermediate opening 244. The curvilinear centerline (CCL) can define a first turn 246 towards the second side 108. The first turn 246 can define an angle that is greater than 90 degrees. The first turn 246 can approach an angle of 180 degrees. For example when considering a pocket 250 as part of the first turn 246 the cooling fluid flow (C) can turn through 180 degrees.

The second portion 240 can further include an impingement zone 248. As illustrated, the first turn 246 can be toward the second side 108 so that impingement occurs at the outer wall 104 along the second side 108 resulting in cooling of the second side 108.

While the set of cooling passages 214 illustrated includes a primary cooling passage 230, any number of cooling passages is contemplated, being one or more. Additionally, the set of cooling passages 214 can be arranged in span-wise sets, such that each cooling passage as shown is part of a set of cooling passages 214 in span-wise arrangement.

Figure 9:
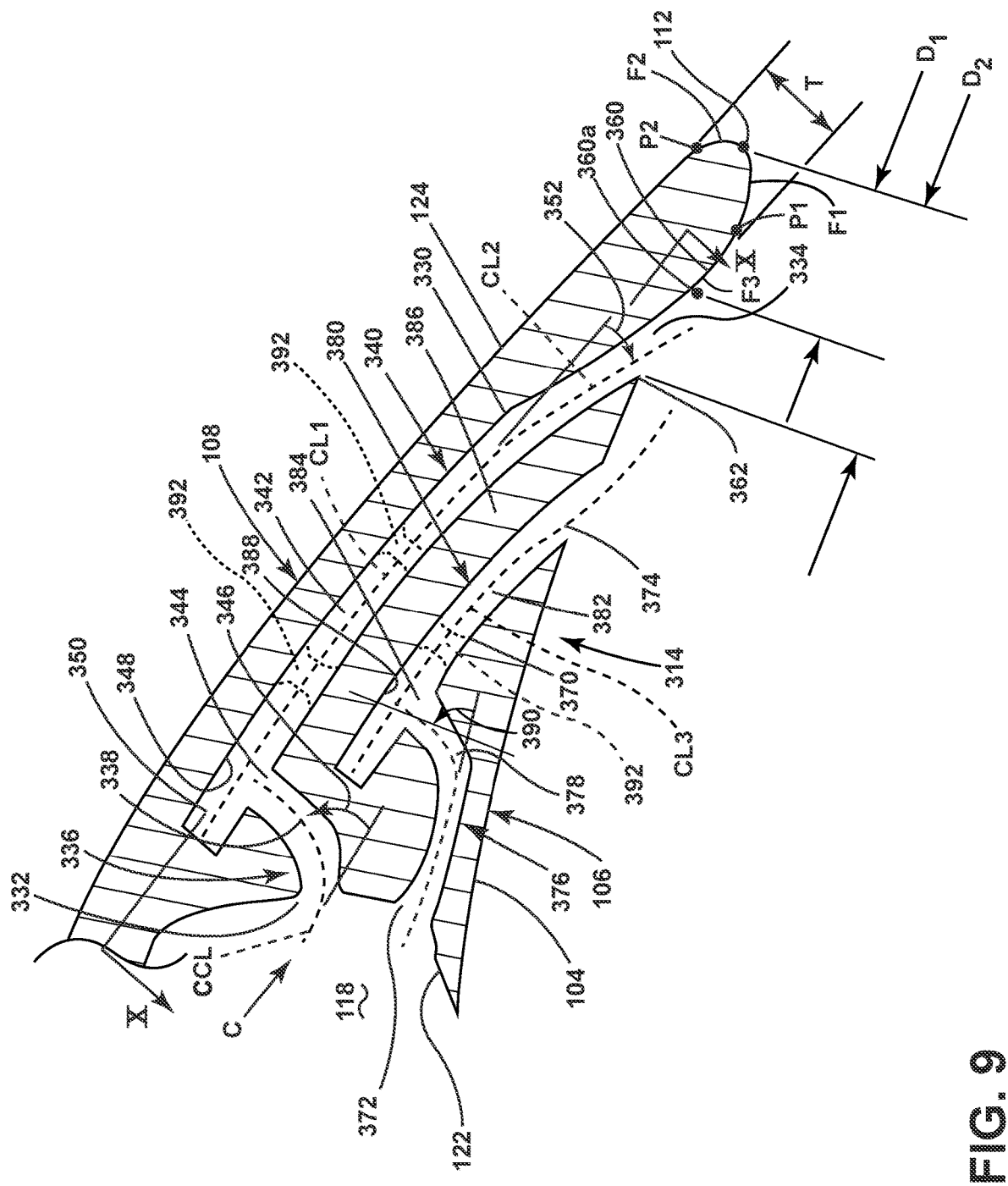
FIG. 9 is another alternative cross-sectional view of the set of cooling passages taken along line of FIG. 2 according to yet another aspect of the disclosure herein.

FIG. 9 illustrates a set of cooling passages 314 according to another aspect of the disclosure discussed herein. The set of cooling passages 314 are substantially similar to the set of cooling passages 114, therefore, like parts will be identified with like numerals increased by 200. It should be understood that the description of the like parts of the set of cooling passages 114 applies to the set of cooling passages 314 unless otherwise noted.

The set of cooling passages 314 are a nested pair of cooling passages including a primary cooling passage 330 and a secondary cooling passage 370 similar in geometry to the primary cooling passage 330. The primary cooling passage 330 can include at least one inlet 332 at the cooling conduit 118 and an outlet 334 at the outer surface 124. The primary cooling passage 330 can be two-part having a first portion 336 including a primary supply passage 338 and a second portion 340 including an outlet passage 342. An intermediate opening 344 can fluidly connect the primary supply passage 338 to the outlet passage 342.

The secondary cooling passage 370 can extend between a second inlet 372 at the cooling conduit proximate the inlet 332 and a second outlet 374 located along the first side 106 upstream of the outlet 334. The secondary cooling passage 370 can also be two-part having a first portion 376 including a supply passage 378 and a second portion 380 including an outlet passage 382. An intermediate opening 384 can fluidly connect the supply passage 378 to the outlet passage 382.

The second portion 340 of the primary cooling passage 330 extends from the cooling conduit 118 toward the trailing edge 112 proximate the second side 108. The outlet passage 342 can define a first centerline (CL1) generally parallel to the second side 108.

The second portion 380 of the secondary cooling passage 370 is spaced from the second portion 340 of the primary cooling passage 330 to define an intermediate wall 386. The outlet passage 382 can define a third centerline (CL3) extending generally parallel to the first centerline (CL1). In some implementations a sum of a length of the first and second centerlines (CL1+CL2) is greater than (CL3) as illustrated.

The second portions 340, 380 can each include an impingement zones 348, 388. The impingement zones 348 can be defined by where a cooling fluid flow (C) from the supply passages 338, 378 impinges on a portion of the outlet passages 342, 382 opposite the intermediate openings 344, 384. It is further contemplated that flow enhancers 392 can be located in both of the second portions 340, 380.

The supply passages 338, 378 can each define curvilinear centerlines (CCL) extending between their respective inlets 332, 372 and intermediate openings 344, 384. The curvilinear centerline (CCL) of the primary supply passage 338 can define a first turn 346 toward the second side 108. The first turn 346 can define an angle that is greater than 90 degrees.

The secondary supply passage 378 can be longer than the primary supply passage 338 in order to include a secondary turn 390 mirroring the first turn 346. The secondary turn 390 is located aft and toward the first side 106 with respect to the first turn 346. As illustrated, the turns 346, 390 can be toward the second side 108. Impingement can therefore occur at the outer wall 104 along the second side 108 and at the intermediate wall 386 resulting in cooling of the second side 108 and the intermediate wall 386.

The primary and secondary cooling passages 330, 370 are nested. Nested meaning that the primary and secondary cooling passages 330, 370 are formed to fit close together such that the secondary cooling passage 370 at least partially mirrors the primary cooling passage 330. In other words the secondary cooling passage 370 can have a smaller foot print and fit within a space between the primary cooling passage 330 and the first side 106.

Additionally, an outlet 334 of the primary cooling passage 330 is illustrated as having a downstream edge 360 along a fillet (F3) while an upstream edge 362 does not have a fillet. Therefore, in this variation as described previously herein, a point 360a located upstream of the downstream edge 360 is where the first distance (D1) is measured from to the trailing edge 112.

While the set of cooling passages 314 illustrated include a primary cooling passage 330 and a secondary cooling passage 370, any number of cooling passages is contemplated, being one or more. Additionally, the set of cooling passages 314 can be arranged in span-wise sets, such that each cooling passage as shown is part of a set of cooling passages 314 in span-wise arrangement.

Figure 10:
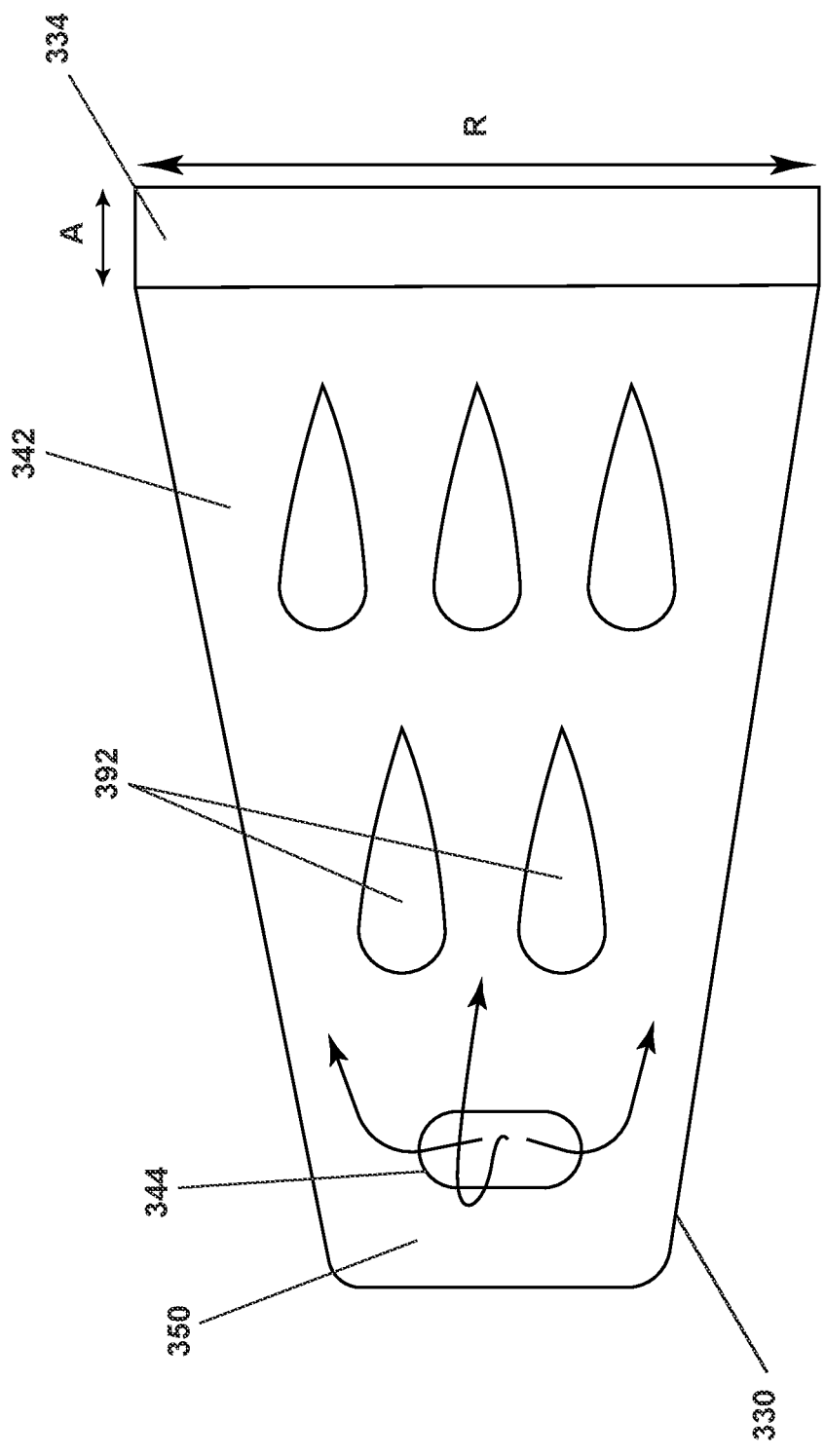
FIG. 10 is a cross-sectional view of the cooling passage taken along line X-X of FIG. 9 illustrating a flow enhancer distribution in the cooling passage.

FIG. 10 is a schematic view of the primary cooling passage 330 taken along line X-X of FIG. 9. The flow enhancers 392 can be pins 394 formed in a tear drop shape. While illustrated as a tear drop shape, the shape of the flow enhancers 392 and/or pins 394 can be any shape including but not limited to square, circle, and diamond or any combination of shapes. The pins 394 can be evenly distributed throughout the second portion of the primary cooling passage 330. While illustrated as evenly distributed pins, it should be understood that any placement of pins 394 is contemplated. An outlet 334 of the primary cooling passage 330 can have an aspect ratio that is less than one. More specifically an axial (A) to radial (R) ratio of the outlet 334 can be between 1:3 and 1:15. It should be understood that the aspect ratio depicted for outlet 334 can also be applied to all outlets described herein.

Figure 11:
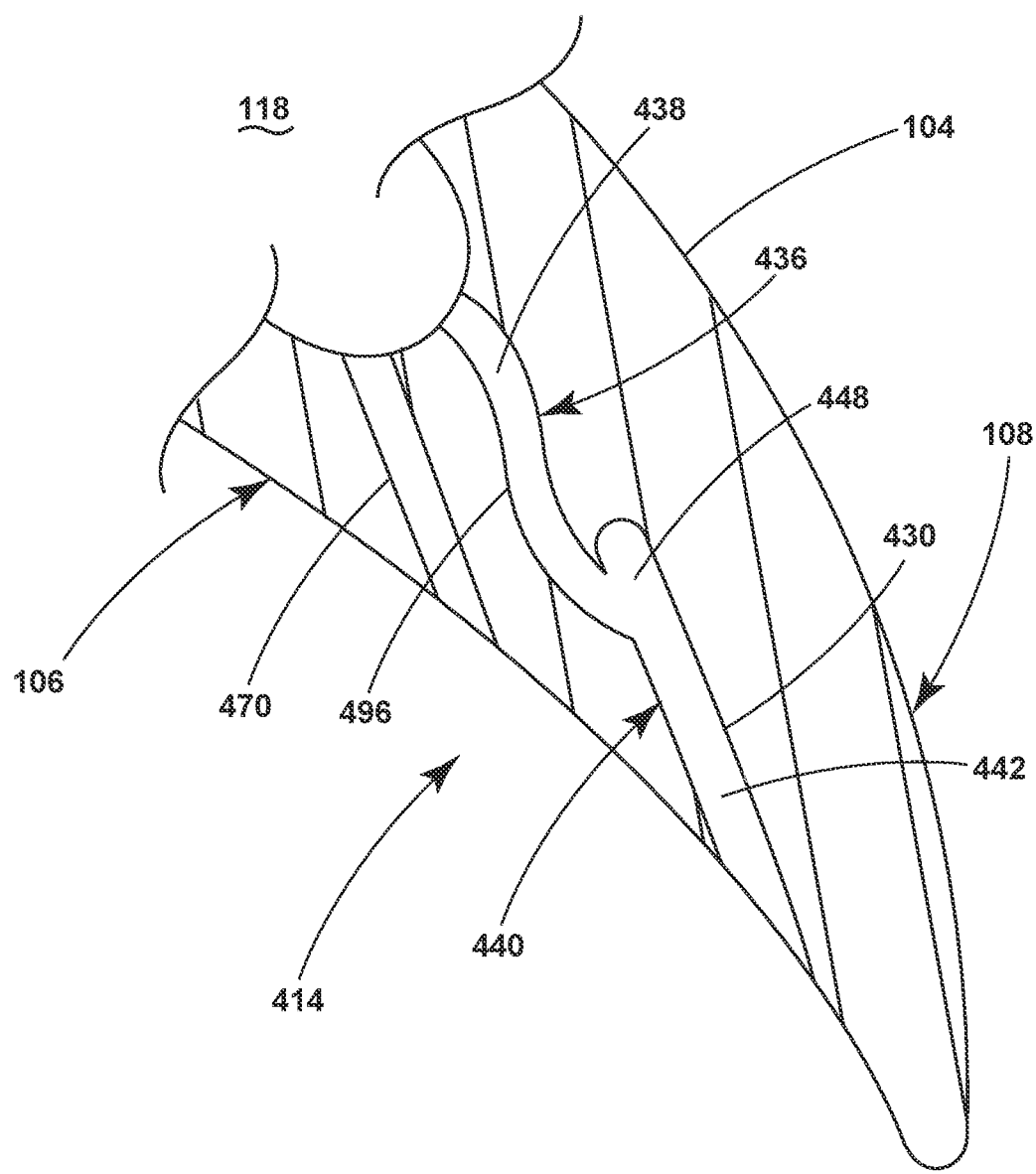
FIG. 11 is a sectional view of the trailing edge of an alternative set of cooling passages with only one cooling passages having a supply passage and an outlet passage.

FIG. 11 illustrates a set of cooling passages 414 according to another aspect of the disclosure discussed herein. The set of cooling passages 414 are substantially similar to the set of cooling passages 114, therefore, like parts will be identified with like numerals increased by 300. It should be understood that the description of the like parts of the set of cooling passages 114 applies to the set of cooling passages 414 unless otherwise noted. The dimensions (T), (D1), and (D2) have been removed for clarity.

The set of cooling passages 414 includes a primary cooling passage 430 extending between at least one inlet 432 at the cooling conduit 118 and an outlet 434 at the outer surface 124. The primary cooling passage 430 can be two-part having a first portion 436 including a supply passage 438 and a second portion 440 including an outlet passage 442. The outlet passage 442 can be straight. An intermediate opening 444 can fluidly connect the supply passage 438 to the outlet passage 442.

The supply passage 438 can define a curvilinear centerline (CCL) extending between the at least one inlet 432 and the intermediate opening 444. In one example, the curvilinear centerline (CCL) can be an "S" shape and include multiple curves. The curvilinear centerline (CCL) can further include an inflection point 496, and can have complex curvature, such as having differing bends, curves, or inflection points extending in three-dimensions, such as in the chord-wise direction, the span-wise direction, the axial direction, the radial direction, the circumferential direction, or any combination thereof.

The second portion 440 can further include an impingement zone 448. As illustrated, impingement occurs at the outer wall 104 along the second side 108 resulting in cooling of the second side 108.

The set of cooling passages 414 can further include a secondary cooling passage 470. The secondary cooling passage 470 can be a straight cooling passage exhausting to the first side 106. Both cooling passages 430, 470 exhaust at the first side 106, while it is contemplated that they can exhaust to the second side 108, or both the pressure and suction sides 106, 108.

It should be appreciated that the cooling passages as described herein can be provided in any portion of an airfoil or engine component, such as the trailing edge of the airfoil as described herein. Furthermore, it should be appreciated that the cooling passages as described herein can have additional applicability to other portions of an airfoil, such as the leading edge, the trailing edge, the pressure side, the suction side, the tip, the root, or even an interior structure of the airfoil, for example. Further still, the cooling hole geometry can have applicability in other engine components, beyond that of an airfoil, such as in a blade, a vane, a strut, a shroud, or a combustor liner in non-limiting examples.

The cooling passages and other complex geometries as described herein can be formed, for example, by additive manufacturing, while traditional methods of manufacture are contemplated. An additive manufacturing (AM) process is where a component is built layer-by-layer by successive deposition of material. AM is an appropriate name to describe the technologies that build 3D objects by adding layer-upon-layer of material, whether the material is plastic or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. Additive manufacturing, such as 3D printing, direct metal laser melting, direct metal laser sintering, or electroforming, can provide for forming the complex geometries as described herein, where such formation by way of traditional manufacture, such as casting or drilling, can be challenging, costly, or time consuming, as well as having poor yields. Further casting via additively producing a core, or making the core via RMC can also be utilized.

A method of cooling an airfoil 92 can include flowing a cooling fluid through a cooling circuit 128. The method can include flowing the cooling fluid (C) through the cooling conduits 118 and passing the cooling fluid (C) to a set of cooling passages 114. Upon receiving the cooling fluid (C), the method can include flowing the cooling fluid (C) through the primary cooling passage 130 and exhausting the cooling fluid near the trailing edge 112 along the outer surface 124.

The method can further include flowing the cooling fluid through the first portion 136 including the supply passage 138 and then through a second portion 140 including the outlet passage 142 where the supply passage 138 is fluidly coupled to the outlet passage 142 at the intermediate opening 144.

The method can further include flowing the cooling fluid (C) along a curved passage and turning the cooling fluid (C) at the first turn 146. The cooling fluid (C) can then impinge on a portion of the outlet passage 142 opposite the intermediate opening 144. The turn can be toward the first side 106 or the second side 108 as described herein. The method can include cooling corresponding first side 106 or the second side 108.

The method can include cleaning the cooling fluid (C) with the pocket 150 prior to flowing the cooling fluid (C) through the remaining portion of the outlet passage 142.

The method can further include turning the cooling fluid at the second turn 152 of less than 90 degrees. Exhausting of the cooling fluid (C) can include exhausting the cooling fluid (C) at a location upstream of the trailing edge 112 as described herein.

It is further contemplated that the method includes flowing a portion of the cooling fluid (C) through the secondary cooling passage 170 as described herein.

The dimensions described herein enable a minimizing of the outlet opening and the thickness proximate the trailing edge. A smaller outlet opening increases the film cooling performance at the trailing edge. A minimal thickness increases the aerodynamic efficiency associated with the engine component. Together these adjustments directly influence the stability of the engine component, and more particularly the airfoil at the trailing edge by increasing the strength of the engine component proximate the trailing edge. Consequently, the life span and durability of the engine component are increased. Additionally, the efficiency of the engine as a whole is also increased which is environmentally beneficial.

Furthermore, the cooling passages and concepts described herein provide for improved local cooling, such as improved impingement cooling. Also, diffusion slot of the outlet passages can provide for a greater surface area for convective cooling of the airfoil, as well as providing for a wider layer of cooling film along the exterior of the airfoil, which provides for a more effective cooling film with greater attachment. The improved cooling can require less cooling air, which can require less bleed air. The lesser amount of required cooling air can lead to increased engine efficiency and decreased specific fuel consumption. The improved film cooling can provide for greater operational temperatures, which can increase engine efficiency, as well as improve component lifetime and reduce maintenance.

It should be appreciated that application of the disclosed design is not limited to turbine engines with fan and booster sections, but is applicable to turbojets and turbo engines as well.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

An engine component for a turbine engine having a working airflow separated into a cooling airflow and a combustion airflow, the engine component comprising a wall defining an interior and having an outer surface over which flows the combustion airflow, the outer surface defining a first side and a second side extending between a leading edge and a trailing edge to define a chord-wise direction with the wall having a thickness "T" proximate the trailing edge; at least one cooling conduit located within the interior and fluidly coupled to the cooling airflow; a primary cooling passage having at least one inlet fluidly coupled to the cooling conduit, a primary outlet on the outer surface, and a passage connecting the inlet to the outlet, with the primary outlet having a downstream point spaced a first distance D1 from the trailing edge, and an upstream point spaced a second distance D2 from the trailing edge, wherein the thickness T is greater than or equal to a difference between the first distance D1 and second distance D2 (T>(D2−D1)).

The engine component of any preceding clause wherein the first distance is greater than or equal to half the thickness (D1>(T/2)).

The engine component of any preceding clause wherein the second distance is greater than or equal to the thickness and the second distance is less than or equal to five times the thickness (T<D2<5*T).

The engine component of any preceding clause wherein the primary cooling passage includes a first portion extending between the inlet and an impingement zone and a second portion extending between the impingement zone and the primary outlet.

The engine component of any preceding clause wherein the first portion has a curvilinear centerline.

The engine component of any preceding clause wherein the curvilinear centerline defines a first turn greater than 90 degrees, the first turn terminating at the impingement zone.

The engine component of any preceding clause wherein the second portion has a first centerline extending toward the trailing edge from the impingement zone and a second centerline extending from the primary outlet toward the first centerline to define a second turn.

The engine component of any preceding clause wherein the second turn is less than 90 degrees.

The engine component of any preceding clause, further comprising a second cooling passage nested with the primary cooling passage proximate the trailing edge and having a second outlet upstream of the primary outlet.

The engine component of any preceding clause wherein the second cooling passage comprises an outlet passage having a third centerline extending generally parallel to the first centerline.

The engine component of any preceding clause wherein a sum of a length of the first and second centerlines is greater than the third centerline.

The engine component of any preceding clause wherein the first portion terminates in an intermediate opening at the impingement zone.

The engine component of any preceding clause wherein the second portion comprises an outlet passage defining a width (A) and the intermediate opening defines a width (B) where a ratio of A:B is less than 3 (A:B<3).

The engine component of any preceding clause wherein the intermediate opening is multiple openings.

The engine component of any preceding clause wherein the second portion comprises an outlet passage defining a width (A), each of the multiple openings defines a diameter (D), and a ratio of the width (A) to a number of multiple openings (N) multiplied by the diameter (D) is less than 4 (A:(N*D)<4).

The engine component of any preceding clause wherein the second portion includes at least one flow enhancer.

The engine component of any preceding clause wherein the second portion comprises a diffusion section.

The engine component of any preceding clause, further comprising a second cooling passage proximate the trailing edge and having a second outlet upstream of the primary outlet.

The engine component of any preceding clause wherein the second cooling passage comprises a straight cooling passage.

The engine component of any preceding clause wherein the at least one inlet is multiple inlets.

An airfoil for a turbine engine having a working airflow separated into a cooling airflow and a combustion airflow, the airfoil comprising a wall defining an interior and having an outer surface over which flows the combustion airflow, the outer surface defining a pressure side and a suction side extending between a leading edge and a trailing edge to define a chord-wise direction with the wall having a thickness "T" proximate the trailing edge; at least one cooling conduit located within the interior and fluidly coupled to the cooling airflow; a primary cooling passage having at least one inlet fluidly coupled to the cooling conduit, a primary outlet on the outer surface, a passage connecting the at least one inlet to the primary outlet, an impingement zone located within the passage between the at least one inlet and the primary outlet, with the impingement zone separating the passage into a first portion, having a curvilinear centerline, extending between the at least one inlet and the impingement zone, and a second portion, having a diffusion section, extending between the impingement zone and the primary outlet.

The airfoil of any preceding clause wherein the curvilinear centerline defines a first turn greater than 90 degrees, the first turn terminating at the impingement zone.

The airfoil of any preceding clause wherein the primary outlet has a downstream point spaced a first distance D1 from the trailing edge, and an upstream point spaced a second distance D2 from the trailing edge, and the thickness T is greater than or equal to a difference between the first distance and the second distance (T>(D2−D1));

The airfoil of any preceding clause wherein the primary outlet has a downstream point spaced a first distance D1 from the trailing edge, and an upstream point spaced a second distance D2 from the trailing edge, and the first distance is greater than or equal to half the thickness (D1>(T/2)).

The airfoil of any preceding clause wherein the primary outlet has a downstream point spaced a first distance D1 from the trailing edge, and an upstream point spaced a second distance D2 from the trailing edge, and the second distance is greater than or equal to the thickness and less than or equal to five times the thickness (T<D2<5*T).

The airfoil of any preceding clause wherein the second portion has a first centerline extending toward the trailing edge from the impingement zone and a second centerline extending from the primary outlet toward the first centerline to define a second turn less than 90 degrees.

The airfoil of any preceding clause, further comprising a second cooling passage extending between a secondary inlet fluidly coupled to the at least one cooling conduit and having a second outlet the outer surface at a location upstream of the primary outlet.

A method of cooling an airfoil, the method comprising flowing a cooling fluid through a cooling circuit, flowing the cooling fluid through at least one cooling conduits and passing the cooling fluid to a set of cooling passages; receiving the cooling fluid in a primary cooling passage, flowing the cooling fluid through the primary cooling passage, and exhausting the cooling fluid near a trailing edge of the airfoil along the outer surface.

The method of any preceding clause, further comprising flowing the cooling fluid through a first portion of the primary cooling passage, the first portion including a supply passage.

The method of any preceding clause, further comprising flowing the cooling flulid through a second portion of the primary cooling passage, the second portion including the outlet passage.

The method of any preceding clause, further comprising flowing the cooling fluid from the first portion to the second portion through an intermediate opening.

The method of any preceding clause, further comprising flowing the cooling fluid along a curved passage and turning the cooling fluid at a first turn located in the first portion.

The method of any preceding clause, further comprising impinging the cooling fluid on a portion of the outlet passage opposite the intermediate opening.

The method of any preceding clause, further comprising cooling a corresponding side proximate the primary cooling passage.

The method of any preceding clause, further comprising cleaning the cooling fluid with a pocket located in the primary cooling passage prior to flowing the cooling fluid through a remaining portion of the outlet passage.

The method of any preceding clause, further comprising exhausting the cooling fluid at a location upstream of the trailing edge.

The method of any preceding clause, further comprising flowing a portion of the cooling fluid through a secondary cooling passage.

What is claimed is:

1. An engine component for a turbine engine having a working airflow separated into a cooling airflow and a combustion airflow, the engine component comprising:
   a wall defining an interior and having an outer surface over which flows the combustion airflow, the outer surface defining a first side and a second side extending between a leading edge and a trailing edge to define a chord-wise direction with the wall having a thickness T proximate the trailing edge;

at least one cooling conduit located within the interior and fluidly coupled to the cooling airflow; and a primary cooling passage having at least one inlet fluidly coupled to the cooling conduit, a primary outlet on the outer surface, a passage connecting at least one the inlet to the primary outlet, the passage defining a first centerline extending in a first direction and a second centerline extending in a second direction different than the first direction, an intersection between the first centerline and the second centerline defining a first turn, and an impingement zone located within the passage upstream from the first turn between the at least one inlet and the primary outlet, with the primary outlet having a downstream point spaced a first distance D1 from the trailing edge, and an upstream point spaced a second distance D2 from the trailing edge, wherein the thickness T is greater than or equal to a difference between the first distance D1 and second distance D2 (T≥(D2−D1)).

2. The engine component of claim 1 wherein the first distance is greater than or equal to half the thickness (D1≥(T/2)).

3. The engine component of claim 1 wherein the second distance is greater than or equal to the thickness and the second distance is less than or equal to five times the thickness (T≤D2≤5*T).

4. The engine component of claim 1 wherein the primary cooling passage includes a first portion extending between the inlet and the impingement zone and a second portion extending between the impingement zone and the primary outlet.

5. The engine component of claim 4 wherein the first portion has a curvilinear centerline.

6. The engine component of claim 5 wherein the curvilinear centerline defines the first turn greater than 90 degrees, the first turn terminating at the impingement zone.

7. The engine component of claim 6 further comprising a second turn downstream from the first turn.

8. The engine component of claim 7 wherein the second turn is less than 90 degrees.

9. The engine component of claim 7, further comprising a second cooling passage nested with the primary cooling passage proximate the trailing edge and having a second outlet upstream of the primary outlet.

10. The engine component of claim 9 wherein the second cooling passage comprises an outlet passage having a third centerline extending generally parallel to the first centerline.

11. The engine component of claim 10 wherein a sum of a length of the first and second centerlines is greater than the third centerline.

12. The engine component of claim 4 wherein the first portion terminates in an intermediate opening at the impingement zone.

13. The engine component of claim 12 wherein the second portion comprises an outlet passage defining a width (A) and the intermediate opening defines a width (B) where a ratio of A:B is less than 3 (A:B<3).

14. The engine component of claim 12 wherein the intermediate opening is multiple openings.

15. The engine component of claim 14 wherein the second portion comprises an outlet passage defining a width (A), each of the multiple openings defines a diameter (D), and a ratio of the width (A) to a number of multiple openings (N) multiplied by the diameter (D) is less than 4 (A:(N*D)<4).

16. The engine component of claim 4 wherein the second portion includes at least one flow enhancer.

17. The engine component of claim 4 wherein the second portion comprises a diffusion section.

18. The engine component of claim 1, further comprising a second cooling passage proximate the trailing edge and having a second outlet upstream of the primary outlet.

19. The engine component of claim 18 wherein the second cooling passage comprises a straight cooling passage.

20. The engine component of claim 1 wherein the at least one inlet is multiple inlets.

21. An airfoil for a turbine engine having a working airflow separated into a cooling airflow and a combustion airflow, the airfoil comprising:

a wall defining an interior and having an outer surface over which flows the combustion airflow, the outer surface defining a first side and a second side extending between a leading edge and a trailing edge to define a chord-wise direction with the wall having a thickness "T" proximate the trailing edge;

at least one cooling conduit located within the interior and fluidly coupled to the cooling airflow;

a primary cooling passage having at least one inlet fluidly coupled to the cooling conduit, a primary outlet on the outer surface, a passage connecting the at least one inlet to the primary outlet, an impingement zone located within the passage between the at least one inlet and the primary outlet, with the impingement zone separating the passage into a first portion, having a curvilinear centerline, extending between the at least one inlet and the impingement zone, and a second portion, having a diffusion section, extending between the impingement zone and the primary outlet.

22. The airfoil of claim 21 wherein the curvilinear centerline defines a first turn greater than 90 degrees, the first turn terminating at the impingement zone.

23. The airfoil of claim 21 wherein the primary outlet has a downstream point spaced a first distance D1 from the trailing edge, and an upstream point spaced a second distance D2 from the trailing edge, and the thickness T is greater than or equal to a difference between the first distance and the second distance (T≥(D2−D1)).

24. The airfoil of claim 21 wherein the primary outlet has a downstream point spaced a first distance D1 from the trailing edge, and an upstream point spaced a second distance D2 from the trailing edge, and the first distance is greater than or equal to half the thickness (D1≥(T/2)).

25. The airfoil of claim 21 wherein the primary outlet has a downstream point spaced a first distance D1 from the trailing edge, and an upstream point spaced a second distance D2 from the trailing edge, and the second distance is greater than or equal to the thickness and less than or equal to five times the thickness (T≤D2≤5*T).

26. The airfoil of claim 21 wherein the second portion has a first centerline extending toward the trailing edge from the impingement zone and a second centerline extending from the primary outlet toward the first centerline to define a second turn less than 90 degrees.

27. The airfoil of claim 21, further comprising a second cooling passage extending between a secondary inlet fluidly coupled to the at least one cooling conduit and having a second outlet the outer surface at a location upstream of the primary outlet.

* * * * *